(12) United States Patent
Ozawa

(10) Patent No.: US 7,186,961 B2
(45) Date of Patent: Mar. 6, 2007

(54) FOOD COOKING CONTAINER

(76) Inventor: Shigeo Ozawa, 7-9, Mita 2-chome, Minato-ku, Tokyo 108-0073 (JP)

( * ) Notice: Subject to any disclaimer, the term of this patent is extended or adjusted under 35 U.S.C. 154(b) by 0 days.

(21) Appl. No.: 10/509,579

(22) PCT Filed: Apr. 25, 2002

(86) PCT No.: PCT/JP02/04170

§ 371 (c)(1),
(2), (4) Date: Jul. 15, 2005

(87) PCT Pub. No.: WO03/082704

PCT Pub. Date: Oct. 9, 2003

(65) Prior Publication Data

US 2006/0081134 A1 Apr. 20, 2006

(30) Foreign Application Priority Data

Apr. 2, 2002 (JP) .............................. 2002-100529

(51) Int. Cl.
*H05B 6/80* (2006.01)
(52) U.S. Cl. ...................................... 219/725; 219/726
(58) Field of Classification Search ................ 219/725, 219/678, 726, 771
See application file for complete search history.

(56) References Cited

U.S. PATENT DOCUMENTS

| | | | | |
|---|---|---|---|---|
| 4,166,208 A | * | 8/1979 | Martel et al. ................ | 219/728 |
| 4,806,371 A | * | 2/1989 | Mendenhall ................. | 426/113 |
| 5,345,069 A | * | 9/1994 | Grindrod ..................... | 219/730 |
| 5,428,209 A | * | 6/1995 | Babu et al. .................. | 219/730 |
| 5,464,969 A | * | 11/1995 | Miller ......................... | 219/735 |
| 6,121,597 A | * | 9/2000 | Igota et al. .................. | 219/725 |
| 6,497,786 B1 | * | 12/2002 | Kilgore et al. ........... | 156/379.8 |
| 6,818,873 B2 | * | 11/2004 | Savage et al. .............. | 219/730 |
| 6,960,748 B2 | * | 11/2005 | Baker ......................... | 219/725 |

FOREIGN PATENT DOCUMENTS

JP 3009019 U 1/1995

(Continued)

*Primary Examiner*—Daniel Robinson
(74) *Attorney, Agent, or Firm*—Lowe Hauptman & Berner, LLP

(57) ABSTRACT

One object of the invention is to provide a container for cooking foods that (1) enables cooking while maintaining an appropriate moisture content, even when the container is heated by an external heating means such as a microwave oven, and (2) can be opened easily. Another object is to provide a container that is equipped with a separate seasoning means that enables the foods to be seasoned automatically, without that needing to be done manually by a user, and for the seasoning means to be removed easily. The container, which is formed of a polyolefin-based sheet, comprises a container body and a cover and is provided with a pressure-releasing part whose adhesion strength is weak enough so that it can be opened by the vapor pressure that is generated inside the container when it is heated. Also provided is a packet that contains liquid seasoning and that can be opened by the vapor pressure that is generated by heating the container, so as to make the liquid seasoning flow out. The seasoning packet has a tab that can be gripped by a user's fingers, enabling said pack to be easily removed after seasoning and cooking.

10 Claims, 11 Drawing Sheets

FOREIGN PATENT DOCUMENTS

| | | |
|---|---|---|
| JP | 11-91833 A | 4/1999 |
| JP | 2981998 B2 | 9/1999 |
| JP | 11-334770 A | 12/1999 |
| JP | 2000-62857 A | 2/2000 |
| JP | 2000-226078 A | 8/2000 |

* cited by examiner

FOOD COOKING CONTAINER

FIELD OF THE INVENTION

The present invention relates to a container for cooking foods (hereinafter generally "container") that is constituted so as to cook foods by using an external heating means, such as a microwave oven, that uses electromagnetic waves.

BACKGROUND ART OF THE INVENTION

Most processed foods, which can be eaten after just being heated by a microwave oven, are sold in a seasoned condition. In addition, some of such processed foods, before being heated, must either (1) have water sprayed thereon or (2) be dipped in water—either of which is troublesome—so that the food will be prevented from drying out due to the evaporation of the moisture therein as a result of their being heated. In order to prevent the food from drying due to heating, the food should be heated in a tightly sealed container. However, when such food is heated in such a sealed container, there is a risk that the container can break because the pressure in the sealed container becomes high. Therefore, how to release the vapor pressure that is generated is a problem. To solve that problem, a container for heating precooked foods is disclosed in Japanese Unexamined Patent Application No. 2000-238860. That container comprises (1) a container body, and (2) a cover that has a ventilation hole and a folded part. The container is constituted in such a way that (1) the ventilation hole is sealed by adhering the folded part onto a flat part of the cover, and (2) the adhered folded part is exfoliated due to the vapor pressure that is generated inside the container when it is heated. Even if the container body is shaped like a cup, plate, or box, the cover is heat-sealed onto the peripheral part of the body, so as to discharge the vapor pressure through the folded part. However, there has not yet been proposed a container for cooking foods that is constituted such that its cover is made so to be easily opened after cooking, nor is there an invention that constitutes a container for cooking foods that is appropriate for all types of foods.

The present invention has been made taking the above into consideration. One object of the present invention is to provide a container for cooking foods (1) that enables cooking to be performed while maintaining the appropriate moisture content of the foods, and (2) that can be opened easily. Another object of this invention is to provide a container for cooking foods that includes, as a separate member, a seasoning means that (1) enables the original taste of foods to be brought out to the fullest extent, (2) automatically seasons the foods, so that it is not necessary to manually season them, and (3) is easily removable from the container.

DISCLOSURE OF THE INVENTION

The present invention is a container for cooking foods to be heated and cooked by an external heating means including a container body for accommodating food ingredients. The container body has an opening with a peripheral edge forming a rimmed part. A cover is adhered to the rimmed part formed at the peripheral edge of the opening to cover the opening. A pressure-releasing part that is adhered to the container body with a weak adhesion force in such a way that a part of the cover is exfoliated by vapor pressure that is generated inside the container when the container is heated by the external heatin means. A seasonin packet has a projected tab grippable by fingers and has an exfoliation part whose adhesion part whose adhesion force is weak and is openable by vapor pressure generated by heating energy directly received from the heating means so that the liquid seasoning inside the container can flow out and season the food ingredients inside the container.

With this container for cooking foods, foods can be cooked using an external heating means such as a microwave oven, while maintaining an appropriate moisture content for the food within the container, so that the original taste of the food can be brought out to the fullest extent, and so that delicious food can be provided. The container is formed to have a pouch-like shape. Thus, the space necessary for storing the food inside is approximately the same as the volume of the food. Therefore, there is no waste of storage space. In addition, the container is easy to carry. Also, the pressure-releasing part is constituted in such a way that the adhesion part is pushed open by the vapor pressure that is generated inside the container when it is heated, which makes the container able to be manufactured easily and to be opened easily.

BEST MODE FOR CARRYING OUT THE INVENTION

Figure 1:
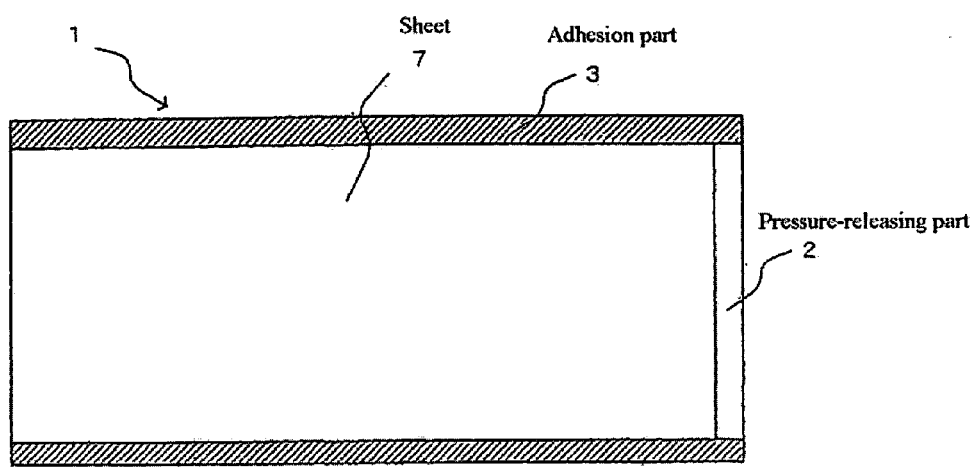
FIG. 1 is a plan view showing a first embodiment of the present invention.
Figure 2:
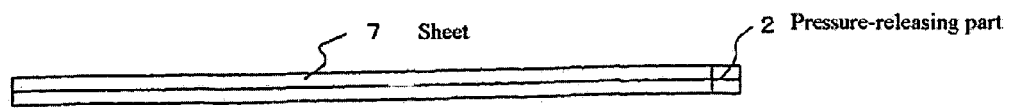
FIG. 2 is a side face view showing a first embodiment of the present invention.
Figure 3:
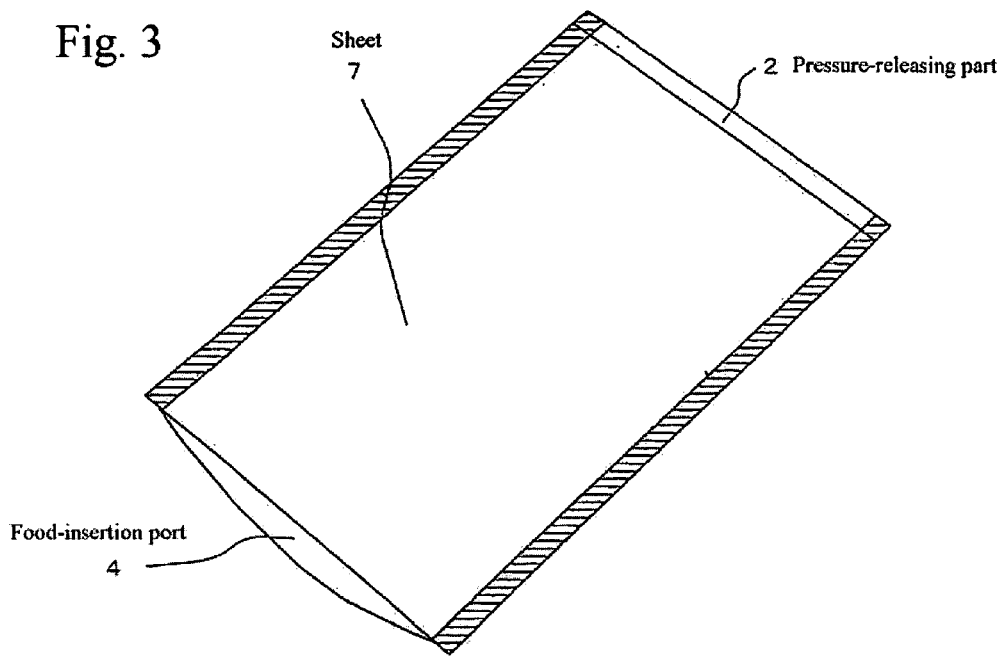
FIG. 3 is a perspective view showing a first embodiment of the present invention.

Embodiments of the present invention will now be described in detail, with reference to the drawings. FIGS. 1–6 show a first embodiment. FIG. 1 is a plan view of a container for cooking foods 1 of the present invention, and FIG. 2 is a side view thereof. FIG. 3 is a perspective view of the container 1 of the present invention. The container 1 is formed by (1) overlaying together two polyolefin-based transparent sheets 7 having appropriate flexibility and heat-resistance at the time of heating, and (2) rigidly adhering together the sheets, wherein the side periphery of each of the sheets is made to be an adhesion part 3. In addition to the adhesion part 3, one sheet's bottom part is adhered to the other sheet's bottom part by a weaker adhesion strength than that used for the adhesion part 3—is formed as a pressure-releasing part 2, and the container is shaped like a pouch. One of the pressure-releasing parts 2 is adhered to the other of the pressure-releasing parts 2 by appropriate adhesion strength in such a way that the pressure-releasing part 2 can be pushed open by the vapor pressure that is generated inside the container when it is heated it.

After the foods are inserted in the container the insertion port 4 is sealed by heat-sealing. Then the container 1 is heated. Thereby, the foods are cooked under a condition such that appropriate moisture content is maintained. An external heating means, such as a microwave oven, is generally used, and the vapor pressure inside the container 1 becomes high due to the heating. However, according to the container 1 of the present invention, the adhesion of the pressure-releasing part 2 is broken when the vapor pressure reaches a predetermined level, whereby heating and cooking can be safely done without a risk of breaking the container 1.

Figure 4:
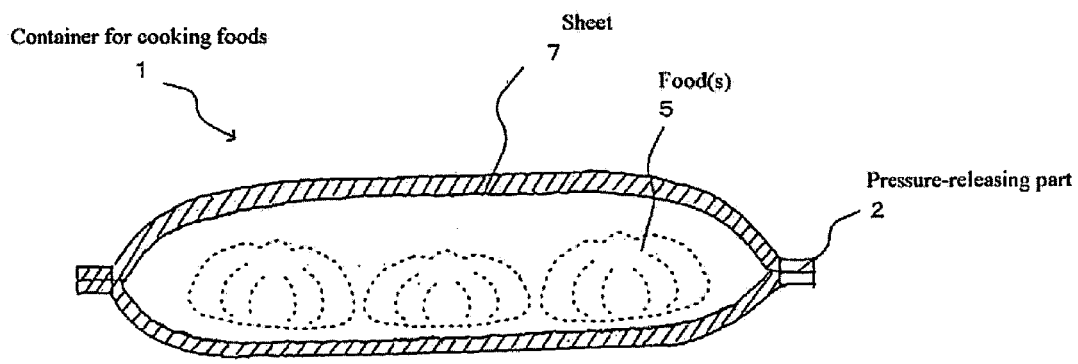
FIG. 4 is a view showing a first embodiment of the present invention in an early stage of heating of the container.
Figure 5:
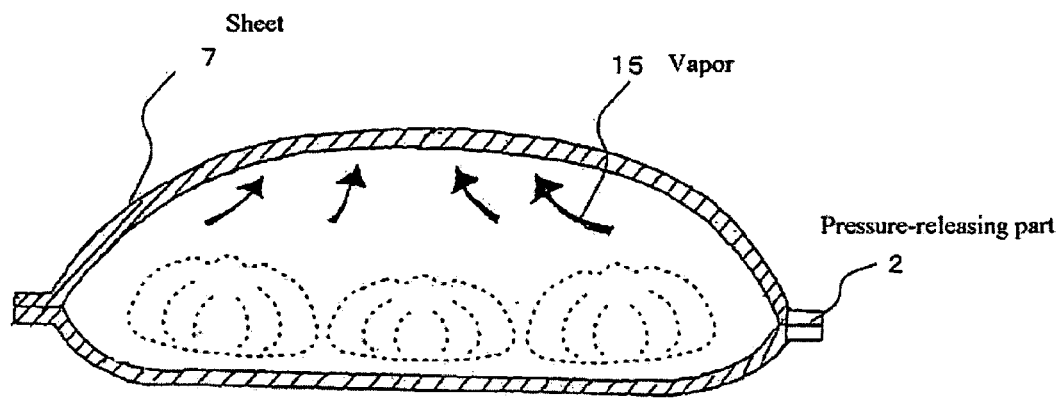
FIG. 5 is a cross-sectional view showing the upward movement of vapor due to the heating of the container.
Figure 6:
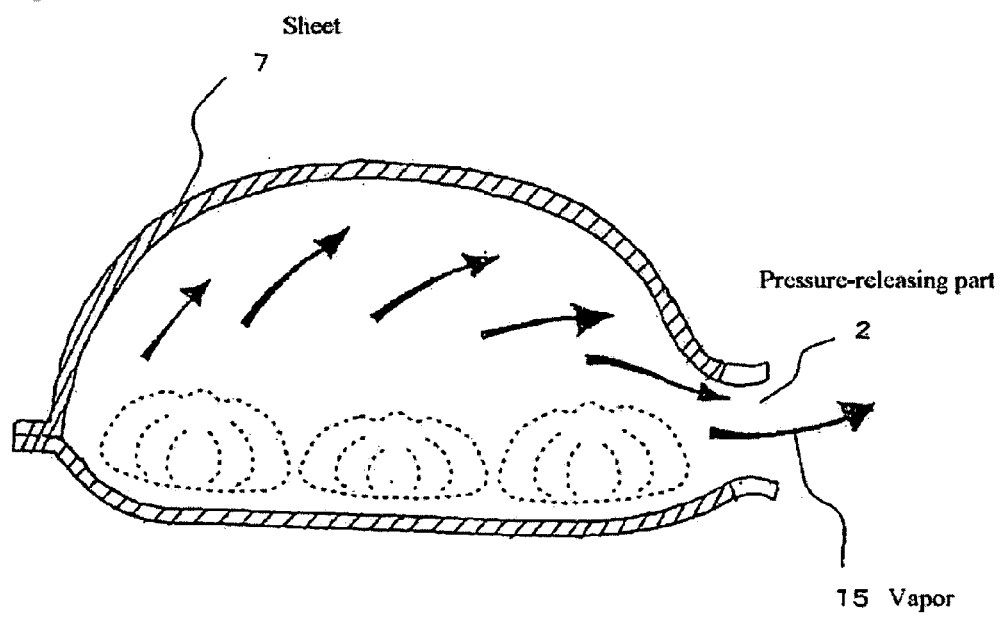
FIG. 6 is a cross-sectional view showing the movement of vapor upward and through the pressure-releasing part due to the heating of the container.

FIGS. 4–6 show the conditions, including the movement of vapor, when the container 1 is being heated after food has been inserted therein.

FIG. 4 shows the condition when the food 5, inserted from the food-insertion part 4 (not shown), has been sealed in by heat-sealing, and vapor pressure has not yet been generated. FIG. 5 shows the condition when vapor 15 is being generated by heating and is pushing up the sheet 7. FIG. 6 shows the condition when the adhesion of the pressure-releasing part 2 has been broken because the pressure of the vapor 15 exceeds the adhesion strength of the pressure-releasing part 2, and the vapor is being discharged. The foods 5 to be cooked in the container 1 are, for example, xiao long bao (steamed juicy pork buns), fried dumplings, shao-mai (steamed dumplings), spring rolls, meat buns, fried rice, and so on, that are cooked by steaming under a moisture-retained condition. Also, because the foods can be heated while maintaining appropriate moisture content, the container prevents the foods from becoming too dry, so that the original taste of the foods can be brought out to the fullest extent.

Figure 7:
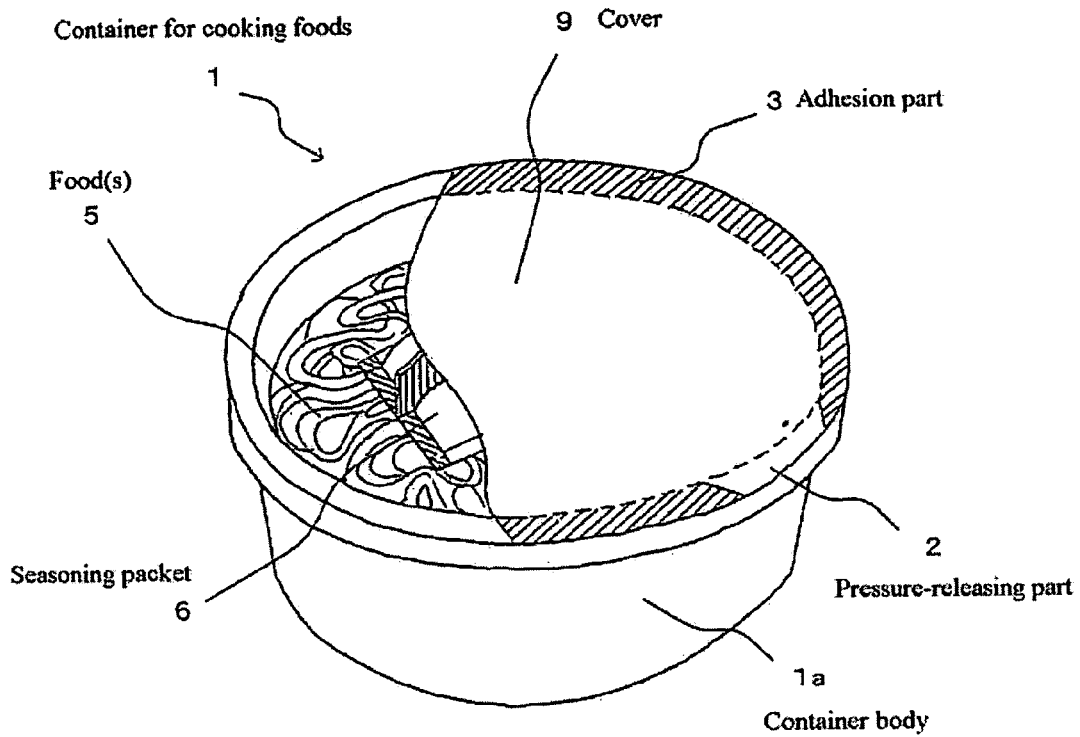
FIG. 7 is a perspective view showing a second embodiment of the present invention.
Figure 8:
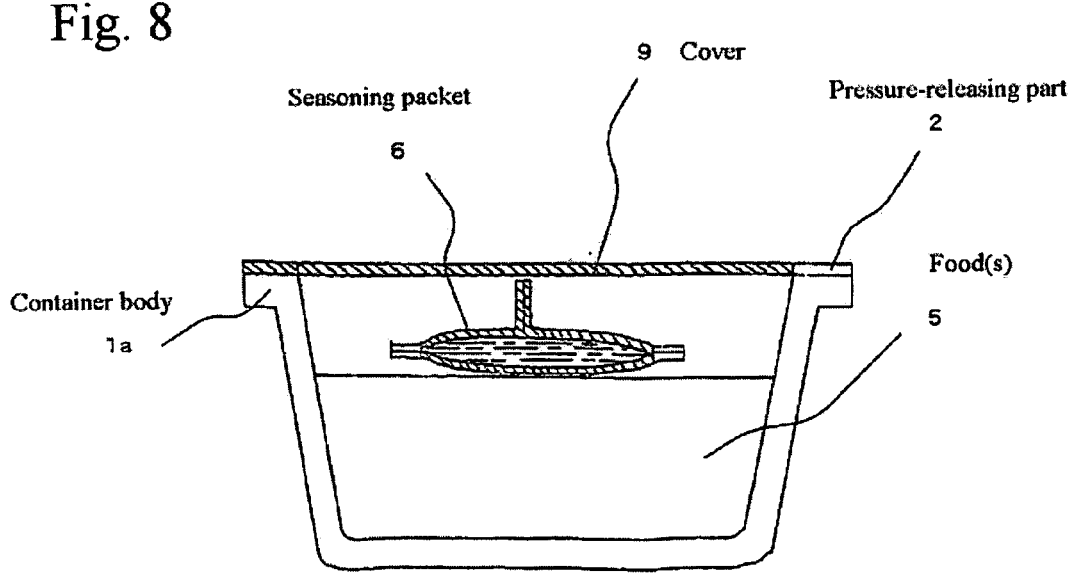
FIG. 8 is a cross-sectional view showing a second embodiment of the present invention

FIGS. 7–12 show a second embodiment. FIG. 7 is a perspective view, and FIG. 8 is a cross-sectional view showing the container 1 of the second embodiment. As shown in FIGS. 7 and 8, in this container 1, the container body 1a is formed into a cylindrical shape with a bottom, the periphery of the opening is rimmed, and the cover 9 is formed so as to have an adhesion part 3 that adheres the cover 9 to the container body 1a in such a way that the cover 9 can cover the container body 1a. A pressure-releasing part 2—which is formed so that it's adhesion force is weaker than the adhesion force of said adhesion part 3, so that one part of a cover 9 can be exfoliated due to the vapor pressure that is generated inside the container when it is heated—is formed on the adhesion part 3. In addition, a seasoning packet 6 is placed on top of the foods 5 so as to enable the foods 5 to be seasoned during heating.

Figure 9:
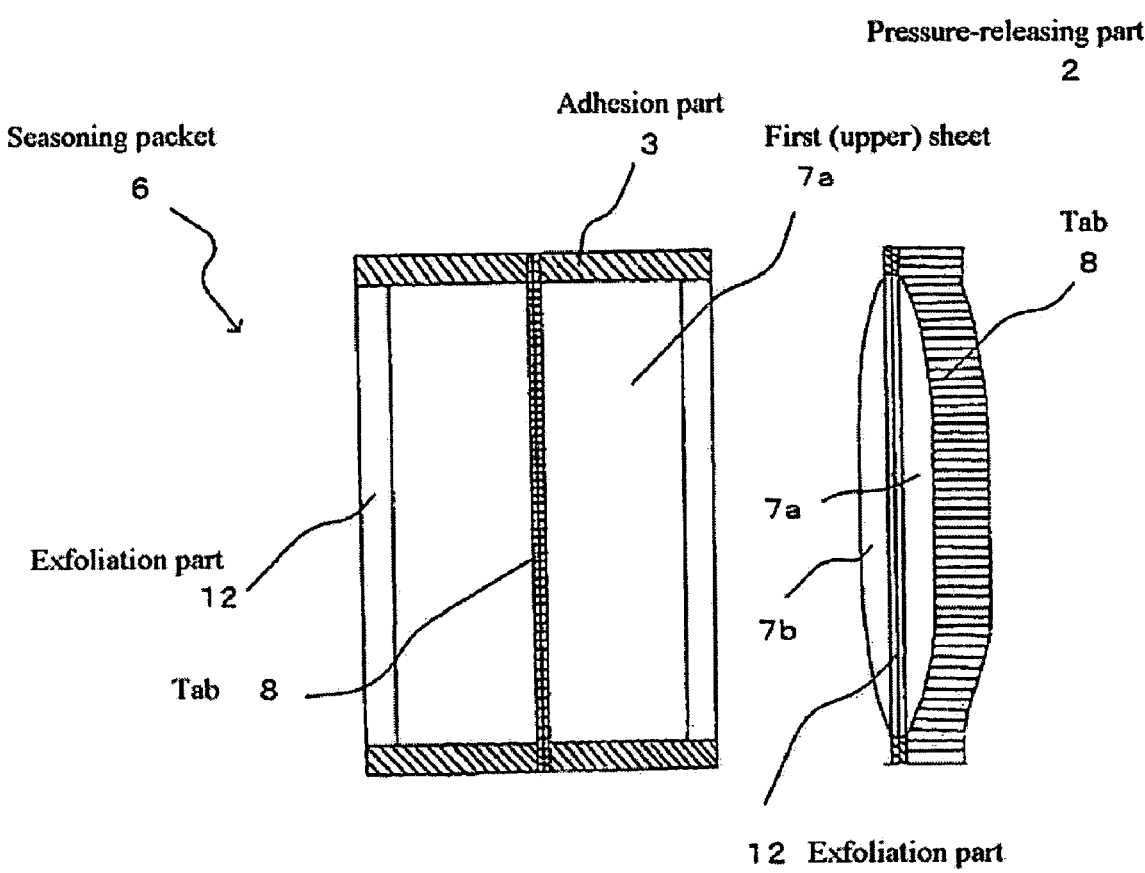
FIG. 9(a) is a plan view of a seasoning packet.
FIG. 9(b) is a side view of the seasoning packet.
Figure 10:
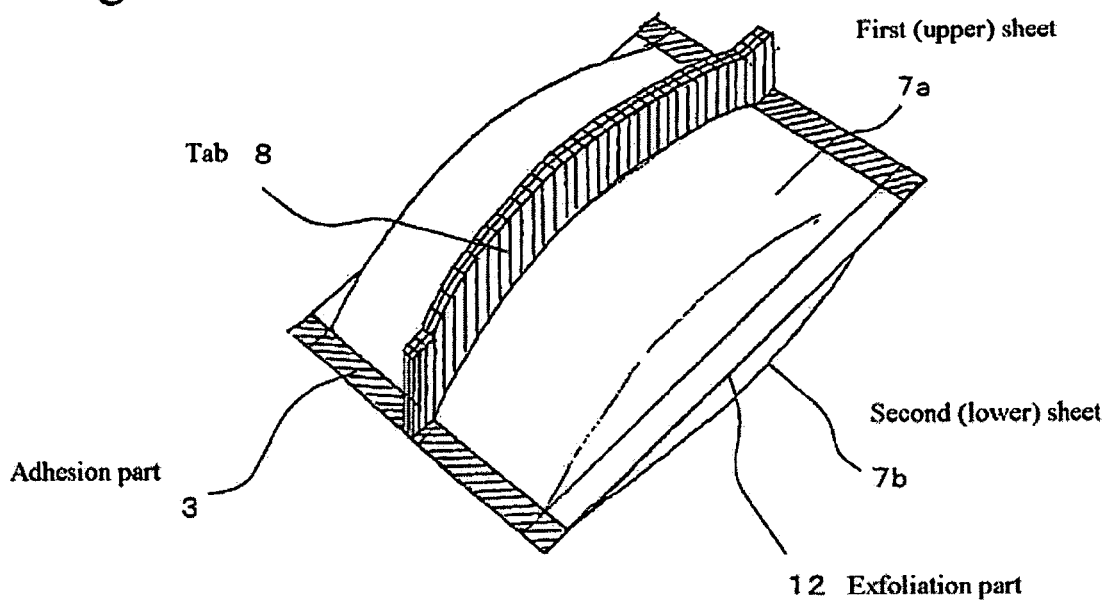
FIG. 10 is a perspective view showing a seasoning packet.

FIGS. 9 and 10 show a seasoning packet 6. FIG. 9(a) is a plan view thereof, and FIG. 9(b) is a side view thereof. FIG. 10 is a perspective view of the seasoning packet 6. The seasoning packet 6 is formed by overlaying two sheets together, and adhering the periphery of the sheets so as to accommodate liquid seasoning therein. One of the two sheets (a first sheet 7a) has a tab 8 that is formed by folding a part of the first sheet 7a and adhering that folded portion to the main portion of said sheet, and that is formed in such a way that the tab 8 can be gripped by a person's fingers. Also, an exfoliation part 12 is formed at one part of both the first sheet 7a and a second sheet 7b that is placed below said first sheet, and is adhered to said sheets 7a and 7b by an adhesion force that is weak enough so that said exfoliation part 12 can be opened by the vapor pressure that is generated inside the container when it is heated, thereby causing the liquid seasoning to flow out of said seasoning packet 6.

Figure 11:
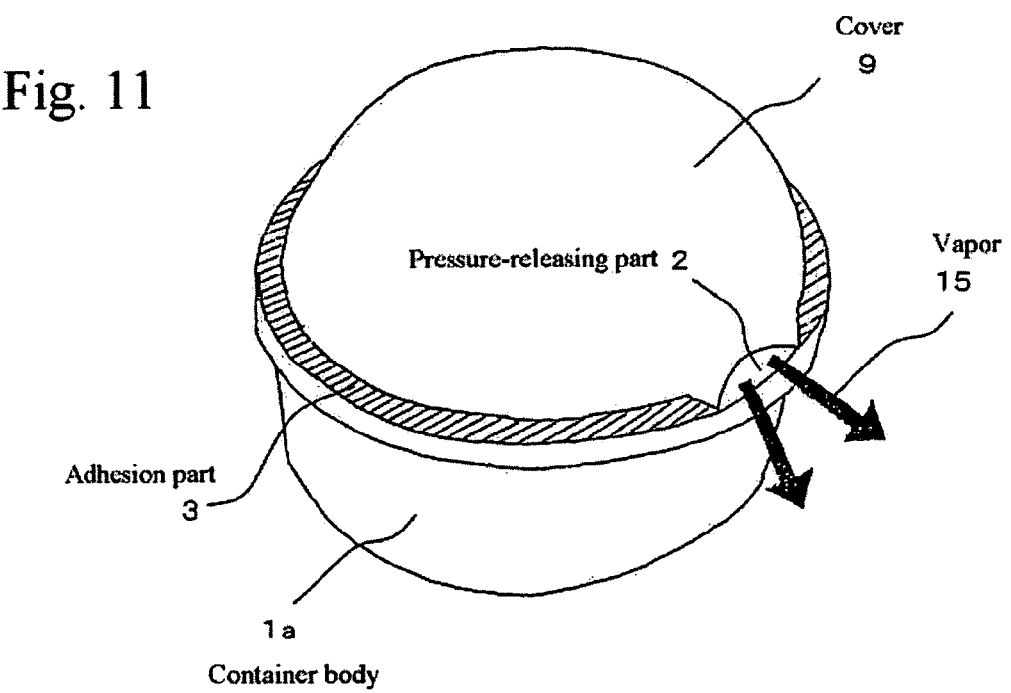
FIG. 11 is an outer-appearance view showing vapor moving through the pressure-releasing part due to the heating of the container.

FIG. 11 shows the situation when the container is heated under the conditions shown in FIGS. 7 and 8. As shown in FIG. 11, the cover 9 has been raised by the vapor pressure caused by heating, but one part of the cover 9 is broken open—thanks to the pressure-releasing part 2—and is discharging the vapor 15 therethrough. As a result, there is no risk that the container 1 will be broken, and heating and cooking can be done safely while preventing drying caused by heating.

Figure 12:
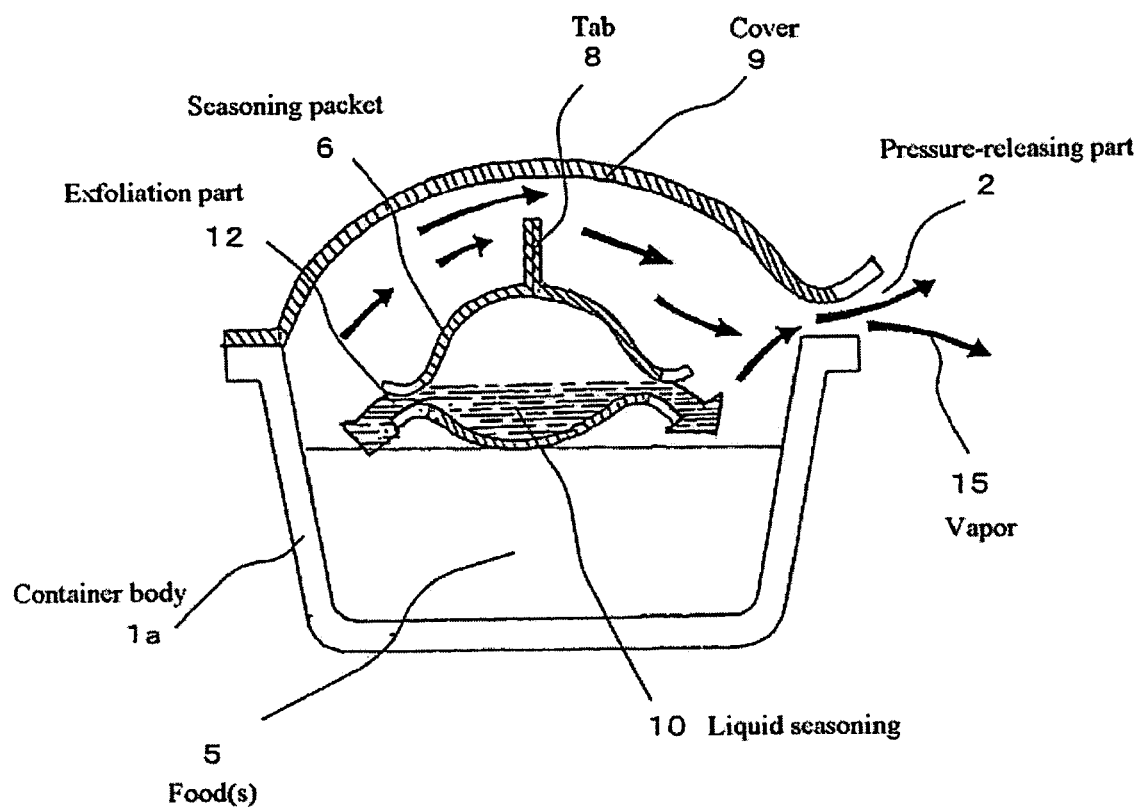
FIG. 12 is a cross-sectional view showing the movement of vapor upward and through the pressure-releasing part due to the heating of the container.

FIG. 12 is a cross-sectional view of the inside of the container 1 that is shown in FIG. 11, under the condition that the container 1 is heated by an external heating means. Inside the container 1, a seasoning packet 6 is accommodated and placed on top of the foods 5. Inside the seasoning packet 6, a liquid seasoning 10 is accommodated, and the adhesion of the exfoliation part 12 of said seasoning packet 6 is broken by the vapor pressure that is generated inside the container when it is heated, whereby the liquid seasoning 10 inside the seasoning packet 6 flows out. Thus, when an external heating means such as a microwave oven is used, the seasoning packet 6 automatically seasons the foods 5 with the liquid seasoning 10. The foods 5 to be heated and seasoned in the container 1 are foods such as noodles or pasta. Therefore, meat sauce, ketchup, or noodle soup, as appropriate, is used as the seasoning to be accommodated in the seasoning packet 6. In this embodiment, the cover 9 and the seasoning packet 6 of the container 1 can be connected together. In such a case, the seasoning packet 6 is simultaneously removed when the cover 9 is opened, and therefore a user's fingers do not become dirty when removing the used seasoning packet 6.

Figure 13:
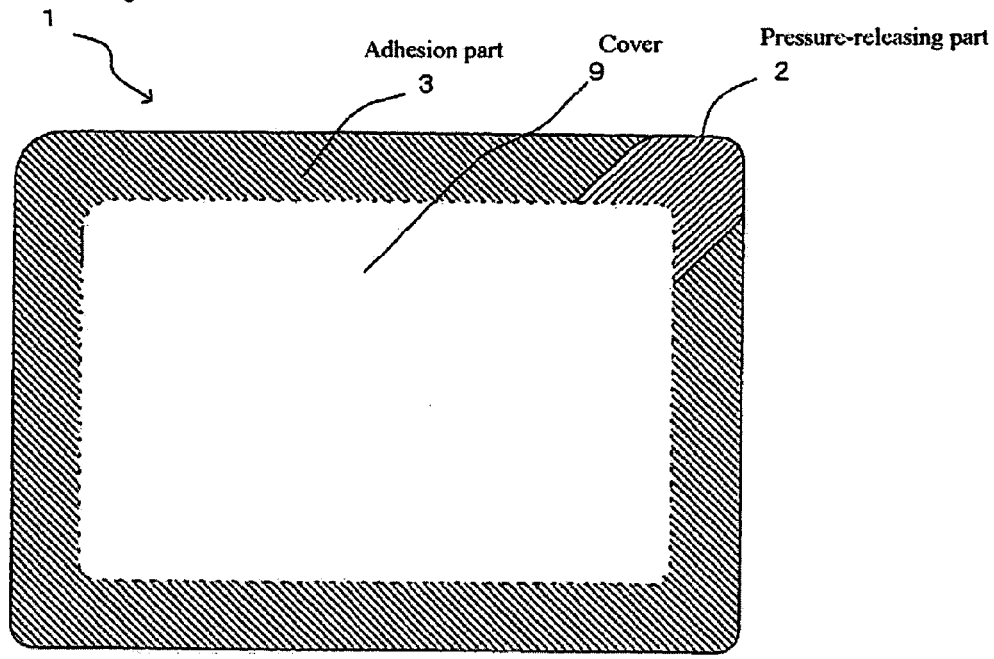
FIG. 13 is a plan view showing a third embodiment of the present invention.
Figure 14:
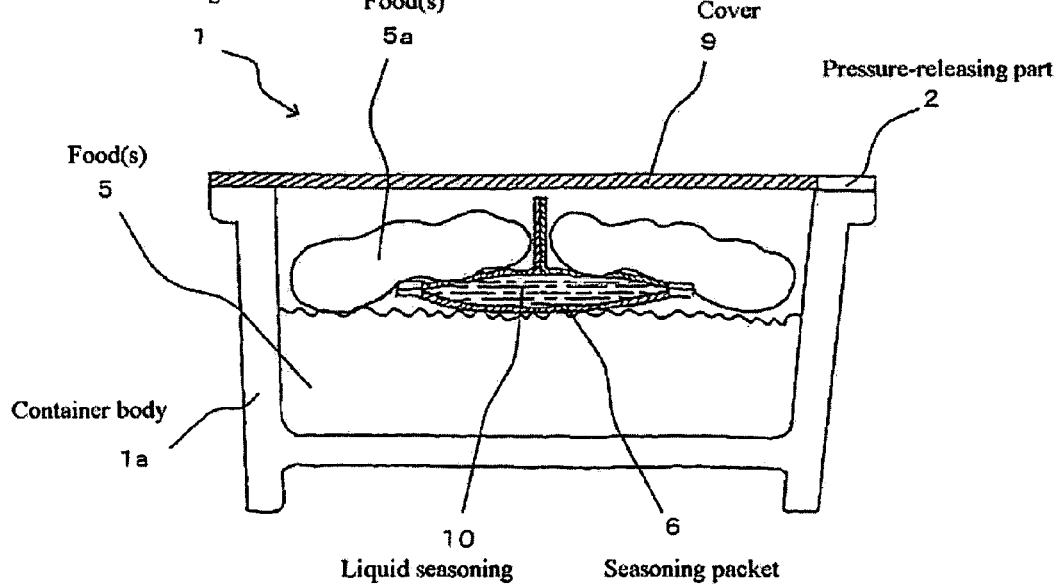
FIG. 14 is a cross-sectional view showing a third embodiment of the present invention.

FIGS. 13–19 show a third embodiment. FIG. 13 is a plan view showing a container 1, and FIG. 14 is a cross-sectional view thereof. As shown in FIGS. 13 and 14, the container body 1a is formed into a rectangular box shape, and the pressure-releasing part 2 is formed at a corner part in such a way that the cover 9 can be exfoliated at the corner part. Also, the seasoning packet 6 is placed on top of the rice (food 5), and the eels (food 5a) are placed on top of the seasoning packet 6, so that mainly the rice will be seasoned. Thus, the container can preferably be used particularly for una-ju (grilled eel and rice in a box), unagi-no-kabayaki (grilled eel in a box), una-don (grilled eel and rice in a bowl), and the like. In this case, the liquid seasoning 10 accommodated in the seasoning packet 6 is a sauce for eels.

Figure 15:
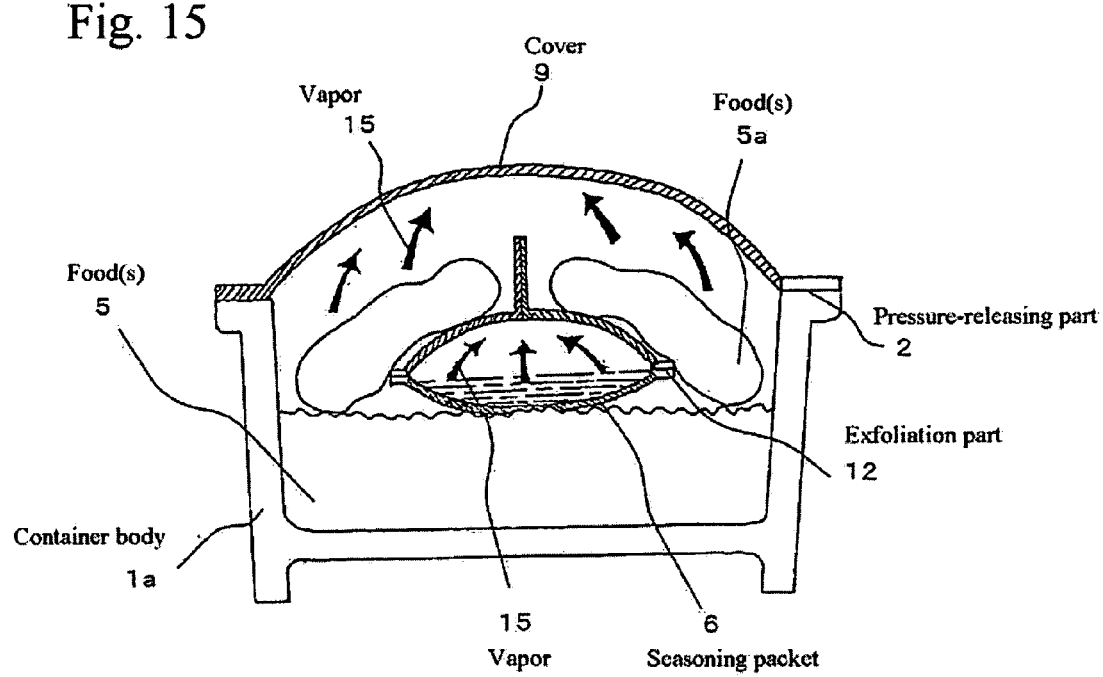
FIG. 15 is a cross-sectional view showing the condition when the container is being heated, showing the movement of vapor upward within a seasoning packet and upward within the container due to the heating of the container.
Figure 16:
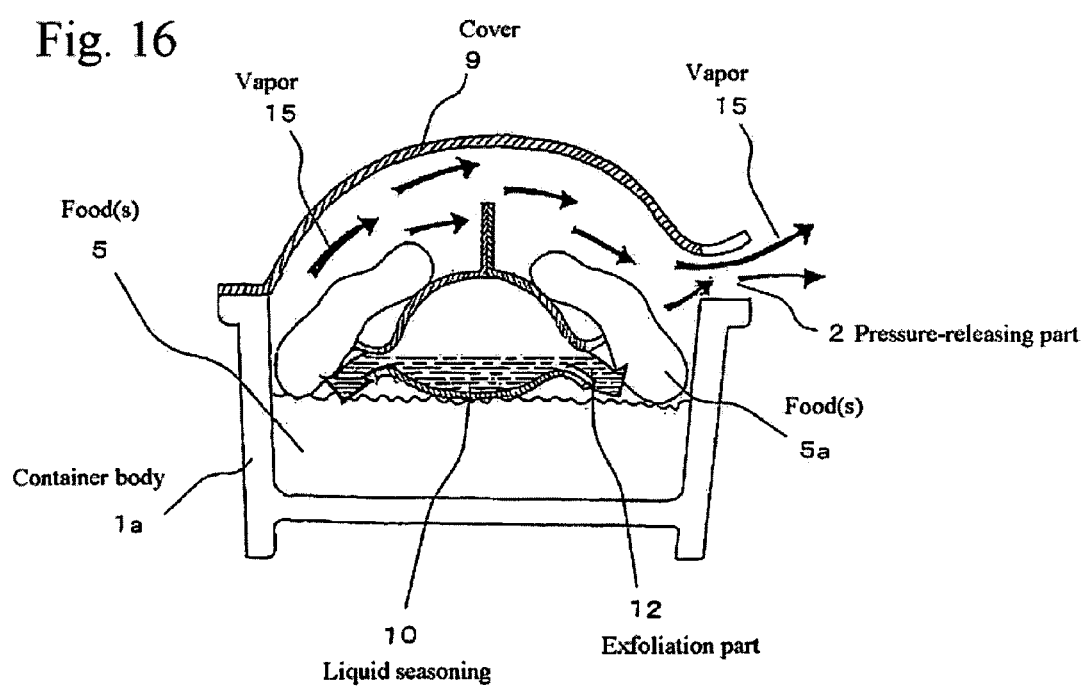
FIG. 16 is a cross-sectional view showing another condition when the container is being heated, showing the movement of vapor upward within the container and through the pressure-releasing part due to the heating of the container.

FIGS. 15 and 16 show the container being heated under the condition shown in FIG. 14. As shown in FIGS. 15 and 16, the cover 9 is raised due to the vapor pressure that is generated inside the container when it is heated, but one part of the cover 9 is exfoliated because of the pressure-releasing part 2, so as to discharge the vapor 15. In addition, the adhesion of the exfoliation part 12 provided to the seasoning packet 6 is exfoliated due to the vapor pressure that is generated inside the container when it is heated, and the liquid seasoning 10 that is inside the seasoning packet 6 flows out. In this embodiment, because the eels that have already been seasoned are used as the food ingredient 5a, the seasoning packet 6 is placed on top of the rice (food ingredient 5), so that mainly the rice is seasoned.

Figure 17:
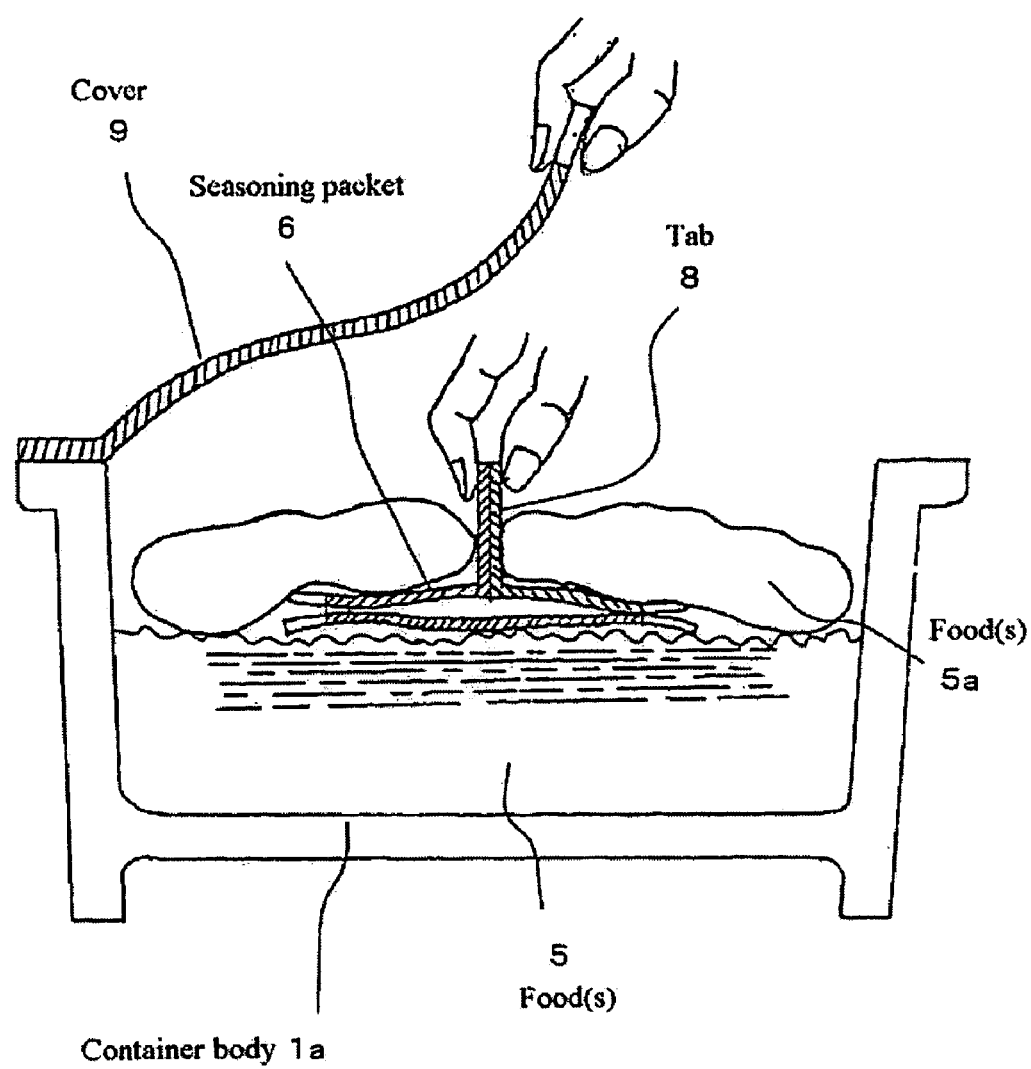
FIG. 17 is an view showing the removal of the seasoning packet after seasoning.

FIG. 17 shows that the cover 9 is opened by a user's fingers after the rice has been seasoned, and that the seasoning packet 6 can easily be removed by gripping the tab 8 of the seasoning packet 6.

In this embodiment, the cover 9 and the seasoning packet 6 of the container 1 can be connected together. Thereby, the seasoning packet 6 is simultaneously removed when the cover 9 is opened, whereby a user can avoid dirtying his or her fingers when doing that. A string can be used as a connecting means, but the connecting means is not limited to a string. Also, the cover 9 and the seasoning packet 6 can be formed integrally. When the cover 9 and the seasoning packet 6 are connected together, the seasoning position can be fixed in the container 1, so that the seasoning 10 is distributed over the rice (food 5) as desired.

Figure 18:
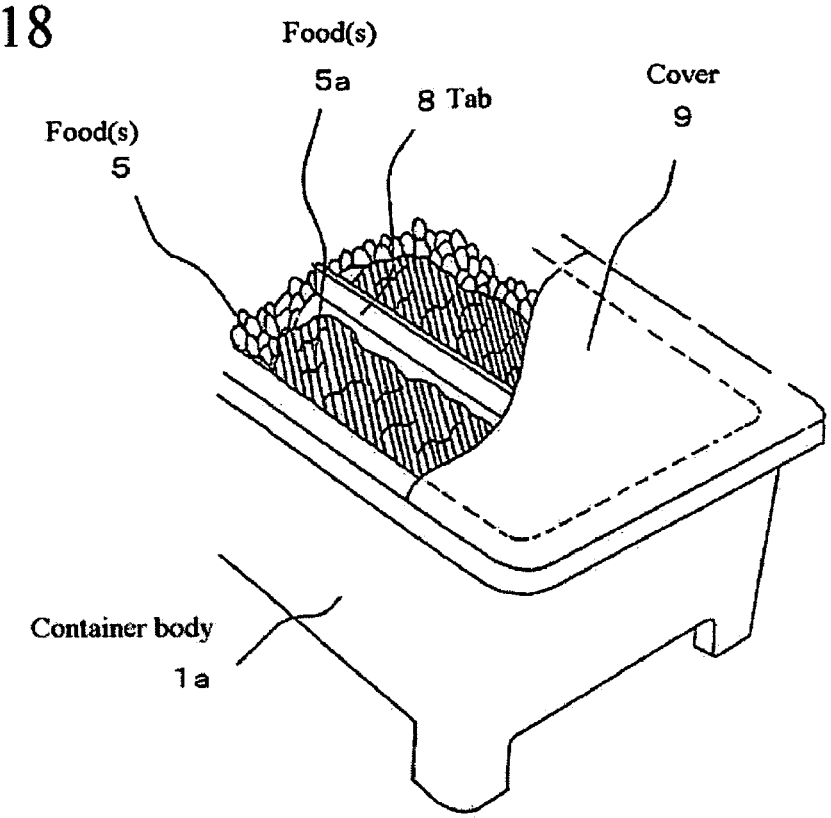
FIG. 18 is a perspective view of that shown in FIG. 17.

FIG. 18 schematically shows the condition shown in FIG. 17. FIG. 18 shows that the tab 8 of the seasoning packet 6 can be visibly recognized in the food 5. Thereby, the seasoning packet 6 can be easily removed without the user dirtying his or her fingers. Also, as shown in FIG. 18, the seasoning packet 6 is placed on top of the rice (food 5) and the eels (food 5a) are placed on top of the seasoning packet 6, whereby movement or dislocation of the seasoning packet 6 is restrained. That is to say, thanks to the weight of the eels (food 5a), even if the container experiences shaking or vibration, the seasoning packet 6 hardly moves and, as a result, at the time of heating and cooking the seasoning will be distributed over the rice as desired.

Figure 19:
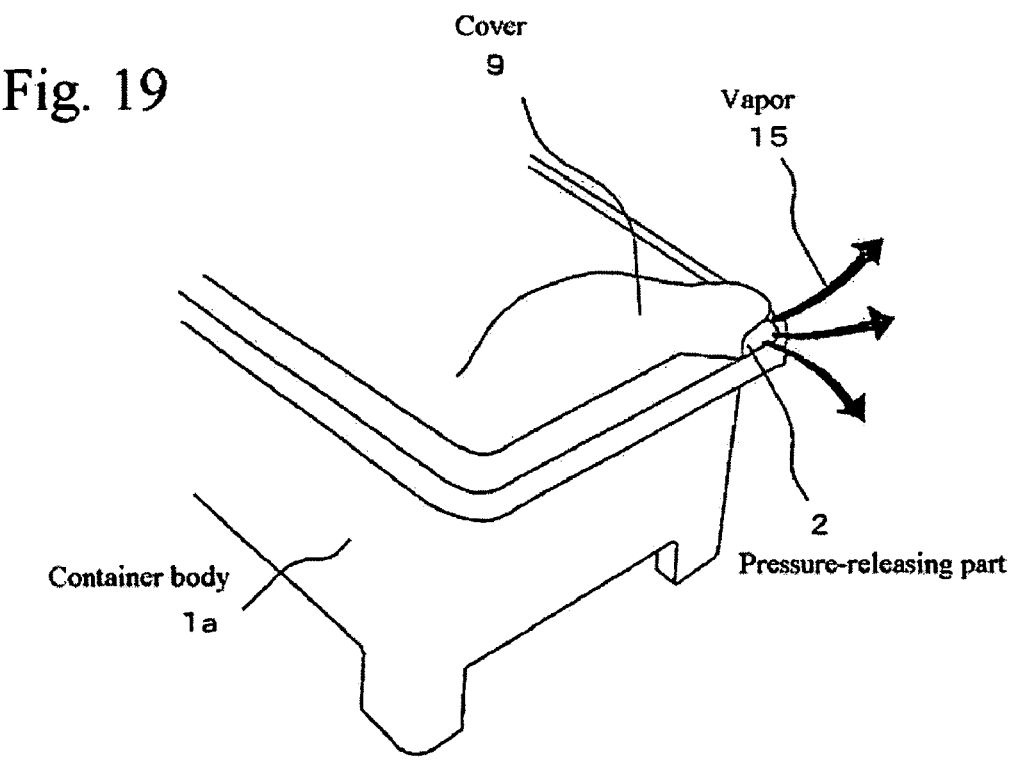
FIG. 19 is an outer-appearance view showing the condition of FIG. 16.

FIG. 19 is an outer-appearance view of the condition shown in FIG. 16. That is to say, at the pressure-releasing part 2, the adhesion of the cover 9 is broken, and the cover 9 is separated from the container body 1a to some extent, and therefore adhesion all around the cover 9 can be broken by the user holding the separated portion with his or her fingers and lifting the cover 9.

As described above, the container 1 of the present invention enables foods to be heated by using a microwave oven or the like under the condition that appropriate moisture content is maintained. In addition, the container 1 can easily be opened. Also, in order to bring out the original taste of foods to the fullest extent, the seasoning means is separately provided, because the foods taste better when they are seasoned just before eating and not beforehand. In addition, thanks to said seasoning means, the foods can be seasoned automatically, without that needing to be done manually by a user, which is very convenient.

As to the seasoning means, the seasoning packet 6 can be formed of an edible material and constituted so as to be eaten together with the food. This can be realized, for example, as follows: (1) the seasoning is absorbed into food that liquidizes when heated, or (2) the seasoning packet 6 is formed of a water-resistant edible material that contains the liquid seasoning 10. That is to say, the edible pack can be realized by (1) mixing soy sauce or some other sauce with a gel body that dissolves with heat, or (2) applying a surface treatment on an oligosaccharide film so as to provide an edible pack that is water-resistant. Furthermore, a seasoning-packet breaking part—which is thin so as to be broken more easily than the peripheral parts of the pack—can be formed in the seasoning packet 6, or the seasoning packet 6 can be formed of a material that is vulnerable to heat and that disintegrates when heated.

INDUSTRIAL APPLICABILITY

As described above, the present invention has the following effects.

The use of an external heating means, such as a microwave oven, enables the seasoning packet to automatically season the foods, so that cooking becomes simple. Also, cooking can be done under the condition that the moisture content is maintained at an appropriate level, so the original taste of a food is brought out to the fullest extent, and delicious foods are provided. In addition, the container can be easily opened from the pressure-releasing part, because the pressure-releasing part is made to slightly open by the moisture inside. When the container is shaped like a pouch, its size can be the same as the volume of the food and the space necessary for storing the container is approximately the same as the volume of the foods. Therefore, there is no waste of storage space. In addition, the container is easy to carry. If the body of the container has a cover on it, an integral design, illustration, and the like such as an advertisement and/or publicity item, can be printed or otherwise applied on the cover. If a packet containing liquid seasoning is provided in the container body, the liquid seasoning is made to flow out by heating, so as to season the foods automatically, without that needing to be done manually by a user, and thus cooking work is reduced.

Also, a tab is provided on the seasoning packet or is connected to the cover, so that the seasoning packet can be removed without the user's fingers becoming dirty when removing the used seasoning packet. When foods such as eels are placed on top of the seasoning packet, the movement of the seasoning packet is restrained by the weight of the foods, and therefore the seasoning is distributed over the rice as desired. Similarly, if the seasoning packet is connected to the cover, the position of the seasoning packet in the container can be fixed and the seasoning is distributed over the rice as desired. If the seasoning packet itself is made of seasoning ingredients, the number of parts that constitute the container can be reduced. Also, because the container is equipped with a pressure-releasing part, there is no risk of breakage of the container, and heating and cooking can be safely done while preventing excess drying of the foods due to the heating.

What is claimed is:

1. A container for cooking foods to be heated and cooked by an external heating means, comprising:
   a container body for accommodating food ingredients, said container body having an opening with a peripheral edge forming a rimmed part;
   a cover that is adhered to the rimmed part formed at the peripheral edge of the opening to cover said opening;
   a pressure-releasing part that is adhered to said container body with a weak adhesion force in such a way that a part of said cover is exfoliated by vapor pressure that is generated inside the container when said container is heated by the external heating means;

a liquid seasoning packet having a projected tab grippable by fingers and having an exfoliation part whose adhesion part whose adhesion force is weak and is openable by vapor pressure generated by heating energy directly received from the heating means, so that the liquid seasoning inside the container can flow out and season the food ingredients inside said container.

2. The container for cooking foods as recited in claim 1, wherein liquid seasoning packet is connected by said tab with said cover.

3. The container for cooking foods as recited in claim 1, wherein said liquid seasoning packet is formed of an edible material so that said liquid seasoning packet can be eaten together with the food ingredient.

4. The container for cooking foods as recited in claim 2, wherein said liquid seasoning packet is formed of an edible material so that said liquid seasoning packet can be eaten together with the food ingredient.

5. The container for cooking foods as recited in claim 1, wherein said foods are noodles or pasta, and that said container body has a cylindrical shape with a bottom.

6. The container for cooking foods as recited in claim 1, wherein said foods are una-ju (grilled eels and rice in a box) or unagi-no-kabayaki (grilled eels in a box), said container body is formed into a box shape, and said cover can be exfoliated at the corners of the container body.

7. The container for cooking foods as recited in claim 6, wherein said liquid seasoning packet is placed on top of said rice and the eels are placed on top of said liquid seasoning packet.

8. The container for cooking foods as recited in claim 1, wherein said liquid seasoning packet is formed integrally with said cover.

9. The container for cooking foods as recited in claim 8, wherein said liquid seasoning packet is equipped with: a first sheet that has a tab or comparable part that can be gripped by a user's fingers; a second sheet formed so as to be overlaid on said first sheet; and liquid seasoning that is accommodated between said first and second sheets; and also characterized such that an exfoliation part is formed at one part of the periphery of said first and second sheets in such a way as to have a weak adhesion force, so that said exfoliation part can be opened by the vapor pressure that is generated inside the container when it is heated, so that said liquid seasoning can flow out from between said first and second sheets.

10. The container for cooking foods as recited in claim 1, wherein said liquid seasoning packet is attached to said cover.

* * * * *